United States Patent [19]
Godeša

[11] Patent Number: 5,912,444
[45] Date of Patent: Jun. 15, 1999

[54] SWITCH RACKING MECHANISM WITH INTERLOCK

[75] Inventor: Ludvik Godeša, Berlin, Germany

[73] Assignee: Siemens Aktiengesellschaft, Munich, Germany

[21] Appl. No.: 08/875,654

[22] PCT Filed: Jan. 16, 1996

[86] PCT No.: PCT/DE96/00107

§ 371 Date: Dec. 3, 1997

§ 102(e) Date: Dec. 3, 1997

[87] PCT Pub. No.: WO96/23338

PCT Pub. Date: Aug. 1, 1996

[30] Foreign Application Priority Data

Jan. 26, 1995 [DE] Germany ............ 195 03 624

[51] Int. Cl.⁶ .................... H01H 9/20; H02B 11/127
[52] U.S. Cl. ................ 200/50.01; 200/50.12; 200/50.24; 361/608
[58] Field of Search .............. 200/50.01, 50.02, 200/50.12–50.17, 50.21–50.25; 361/606–610, 615, 616

[56] References Cited

U.S. PATENT DOCUMENTS

| | | | |
|---|---|---|---|
| 4,491,896 | 1/1985 | Rickmann | 200/50.27 X |
| 4,724,288 | 2/1988 | Kugler | 200/50.01 |
| 5,334,808 | 8/1994 | Bur et al. | 200/50.21 |
| 5,691,518 | 11/1997 | Jones et al. | 200/50.21 |

FOREIGN PATENT DOCUMENTS

| | | |
|---|---|---|
| 2 581 805 | 11/1986 | France . |
| 35 45 780.5 | 6/1987 | Germany . |
| 41 31 328 | 3/1993 | Germany . |
| 43 15 490 | 11/1994 | Germany . |
| 44 20 582 | 12/1995 | Germany . |

*Primary Examiner*—J. R. Scott
*Attorney, Agent, or Firm*—Kenyon & Kenyon

[57] ABSTRACT

A device for affecting a traveling system of a switching device, which blocks the traveling system to prevent its operation when a door of a switchboard cell is opened. The device includes a blocking lever mounted on the traveling system and a push rod that can be operated by the door. The push rod and has a leg that can be displaced by movement along an inclined face. The blocking lever engages the leg via a contact angle. The blocking lever can be operated in each of the positions of the switching device inside the switchboard cell to block or release the traveling system.

5 Claims, 4 Drawing Sheets

SWITCH RACKING MECHANISM WITH INTERLOCK

BACKGROUND OF THE INVENTION

1. Field of the Invention

The present invention concerns a device for influencing a traveling system of a mobile switching device as a function of the position of a door of a switchboard cell that accommodates the switching device. The traveling system has a threaded spindle and a slide is arranged in the access route to the threaded spindle. The slide can be blocked by a blocking element as a function of a push rod that is under an initial tension in a resting position due to a restoring force and can be operated by the door.

2. Description of the Prior Art

A travelling system is disclosed by German Patent No. 3 545 780. The traveling system is in a stationary mount and has a threaded spindle through which a cross element on which the switching device acts can be moved. The blocking element is mounted on the front end of a guide rod that is entrained by rotation of the threaded spindle in such a way that the blocking element always has the same basic position relative to the head of the threaded spindle. However, the blocking element can be displaced to release the position lock using the tool provided for operation of the threaded spindle. The slide that can be operated by the door of the switchboard cell blocks the guide rod with the blocking element through a flexible transmission element.

In another known switchgear design, the traveling system is mounted on the mobile-mounted switching device. In conjunction with this, it has already been proposed (e.g., German Patent Application P 44 20 582) that a blocking lever be provided on the traveling system of the switching device as a blocking element that can be operated by the door of the switchboard cell that accommodates the switching device. Such an arrangement requires a mechanical connection between the door or the push rod operated by the door and the blocking lever, but the latter changes its position relative to the push rod due to the traveling movement of the switching device. The object of that device is to create a suitable device that is automatically brought in to engagement by insertion of a switching device into a switchboard cell and is effective regardless of the different positions of the switching device inside the switchboard cell.

SUMMARY OF THE INVENTION

With a device with a traveling system that is mounted on the switching device and has a blocking lever that is mounted so it can pivot and has a working face, the object of the present invention is achieved due to the fact that the push rod has a leg that can be displaced along an inclined face as the operating element of the blocking lever. The inclined face is arranged at an angle of slope such that the blocking lever assumes a blocking position when the door is opened and can be transferred to a release position by the leg through an axial force acting on the push rod due to the closing of the door.

Due to the displacement of the push rod along the inclined face, there is a change in relative position of the respective section of the push rod with respect to the switching device, so the blocking lever can be operated. Therefore, with a suitable relative arrangement of the push rod and the power switch, the blocking lever is essentially acted upon with the closing of the door, regardless of which of the possible positions the switching device assumes, in particular the operating position, the test position or the isolating position.

With gas-insulated medium-voltage switchgear, a locking device is already known that serves to close the access to an operating shaft of a switch mechanism when the door of a cable connection compartment is opened (e.g. German Patent No. 41 31 328 A1). For this purpose, the locking device has a slide that can be operated by a transmission rod to cover the operating shaft. The transmission rod is connected to the sash fastener of the door closure in such a way that in opening the door the operating shaft is necessarily blocked to prevent operation. The present invention, however, concerns mobile-mounted switching devices and a device for blocking the respective traveling system when the door of a switchboard cell accommodating the switching device is opened. The traveling system to be blocked is mounted on the switching device while a push rod on which the door acts is arranged in a stationary mount.

The push rod may have a basic U-shaped design with two legs, where one leg is guided in a guide tube running approximately at a right angle to the plane of the switchboard cell door, and the other leg is kept in contact with the inclined face by the restoring spring. The guide tube may be adapted to the diameter of the push rod with little play because, except for an axial displacement of the push rod when closing the door or when opening it, there is only a slight angular rotation due to the displacement of the other leg of the push rod along the inclined face. The constant contact of one leg of the push rod with the inclined face can be achieved by mounting the restoring spring with a suitable angle of action.

The aforementioned inclined face may be part of a carrier of the guide tube to be mounted on the bottom of the switchboard cell. The guide tube may also have a threaded section and the carrier may have a feed-through opening for the threaded section so that the guide tube can be mounted so that it is adjustable in the depth range of the switchboard cell. This design creates the possibility of designing the device for influencing the traveling system of the switching device as an easily upgradable module.

The term switchboard cell in conjunction with the preceding explanation of the present invention is understood to refer to a compartment in a switching system or a control cabinet that is provided to accommodate a switching device and has the necessary accessory equipment such as rails, isolating contacts, partitions and other parts. In a known manner, the above-mentioned auxiliary equipment may be mounted on an insertion rack that is inserted into the switching system or the control cabinet. Power switches for low voltage or medium voltage or combinations of switching devices on a common carrier can be used as the switching device.

BRIEF DESCRIPTION OF THE DRAWINGS

The present invention is explained in greater detail below on the basis of the embodiment illustrated in the figures.

FIG. 5 shows the push rod with the door of the switchboard cell opened, while FIG. 6 shows the push rod with the door closed.

FIG. 7 shows the condition when the door is opened, and FIG. 8a when the door is closed.

DETAILED DESCRIPTION OF THE INVENTION

Figure 1:
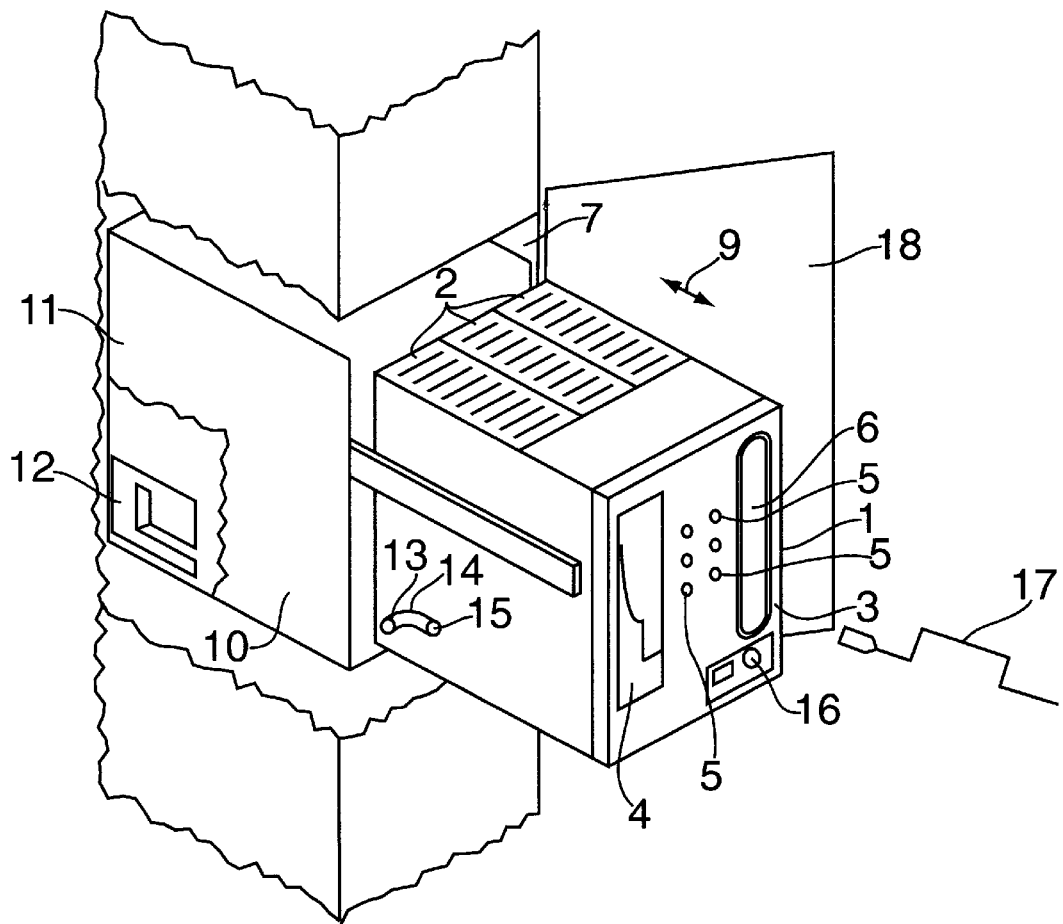
FIG. 1 shows a schematic diagram of a low-voltage power switch in combination with a switchboard cell and an insertion rack arranged in it.

FIG. 1 shows a low-voltage power switch with arcing chambers 2 and an operator's console 3. An electronic overcurrent release 4 is shown on the left of the operator's console 3 and a hand lever 6 for loading an energy storage spring is shown on the right, while operating elements 5 for operation of switching device 1 are shown in the middle. A switchboard cell 7 is a component of a control cabinet or a multiple-panel switchgear and it contains an insertion rack 10 into which switching device 1 can be inserted. Side walls 11 of insertion rack 10 are provided with a link piece 12 in which engages a crank pin 13 of a crank arm 14 that can be pivoted by an insertion shaft 15. An orifice 16 in operator's console 3 serves to insert a tool 17 for introducing and withdrawing switching device 1 in the direction of double arrow 9. Switchboard cell 7 can be closed by a door 18, shown here in the open position.

Insertion shaft 15 is a component of a traveling system 20 (shown in detail in FIG. 2) which is designed as an assembled component and is mounted on the lower side of switching device 1 (FIG. 1). Traveling system 20 includes a base plate 21 and two side walls 22 standing at a right angle to base plate 21. A single-thrust bearing 23 connected to side walls 22 serves to provide axial support for a threaded spindle 24 through which insertion shaft 15 is rotatable. This is accomplished by a traveling nut 25 that sits on threaded spindle 24 and is connected to a gear rack 26 that is guided on base plate 21. Teeth 30 of two gear wheels 31 attached in parallel to each other on insertion shaft 15 work together with holes 27 arranged in two parallel rows. A crank arm 14 with a crank pin 13 is provided on each end of insertion shaft 15.

Traveling system 20 also has a display device (labeled as 32 as a whole) for showing the position of switching device 1 in its insertion rack 10 (FIG. 1). Although display device 32 is described in detail in German Patent Application P 44 20 582, only the details necessary for an understanding of how traveling system 20 works together with door 18 (FIG. 1) are explained below.

Display device 32 (FIG. 2) has a drum 33 mounted rotatably on base plate 21, with wire cable 34 connected to traveling nut 25 and in contact with the circumference of said drum. A spring (not shown) accommodated in the interior of drum 33 prestresses drum 33 so that wire cable 34 is under constant tension. Thus, drum 33 also moves at the same time as insertion shaft 15 due to the rotation of threaded spindle 24 by a tool 17 (FIG. 1), connected to head piece 35 at the end of threaded spindle 24. Thus, in a viewport on the operator's console 3, the user can view marks on the circumference of drum 33 to determine the positions of switching device 1, in particular the operating position, the test position and the isolating position.

Access to head piece 35 of threaded spindle 24 can be blocked by a slide 36 and a locking element 37 that is mounted on the slide. Both parts are explained below with additional reference to FIGS. 3 and 4. Slide 36 is guided displaceably on base plate 21 in the direction of the longitudinal axis of threaded spindle 24 and is prestressed by a draw spring 40 in the direction of drum 33. A snap-in pin 41 of slide 36 works together with recesses arranged on the circumference of drum 33 in positions that correspond to the above-mentioned positions of switching device 1 within insertion rack 10. Furthermore, slide 36 has an angle bend 42 on the front side, forming a stop face 43 for tool 17 (FIG. 1). Therefore, slide 36 is displaced when tool 17 is attached to head piece 35 and thus snap-in pin 41 is disengaged from drum 33.

Figure 3:
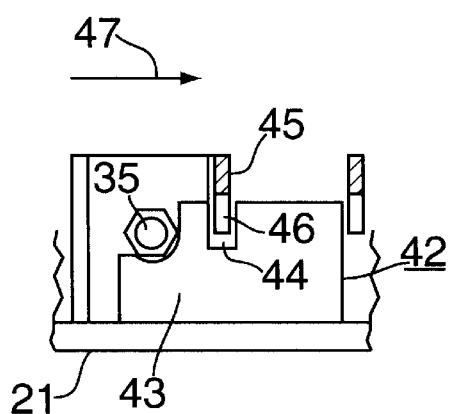
FIG. 3 is a front view.
Figure 4:
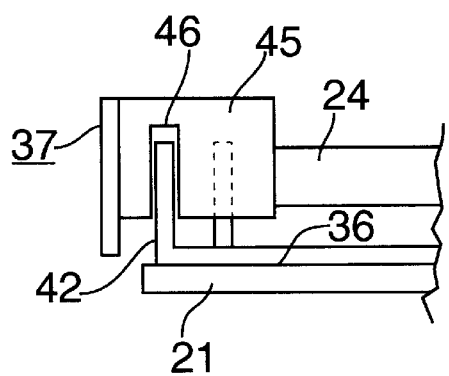
FIG. 4 is a side view of a slide arranged in the front face area of the device according to FIG. 2 and a respective closing element.
Figure 2:
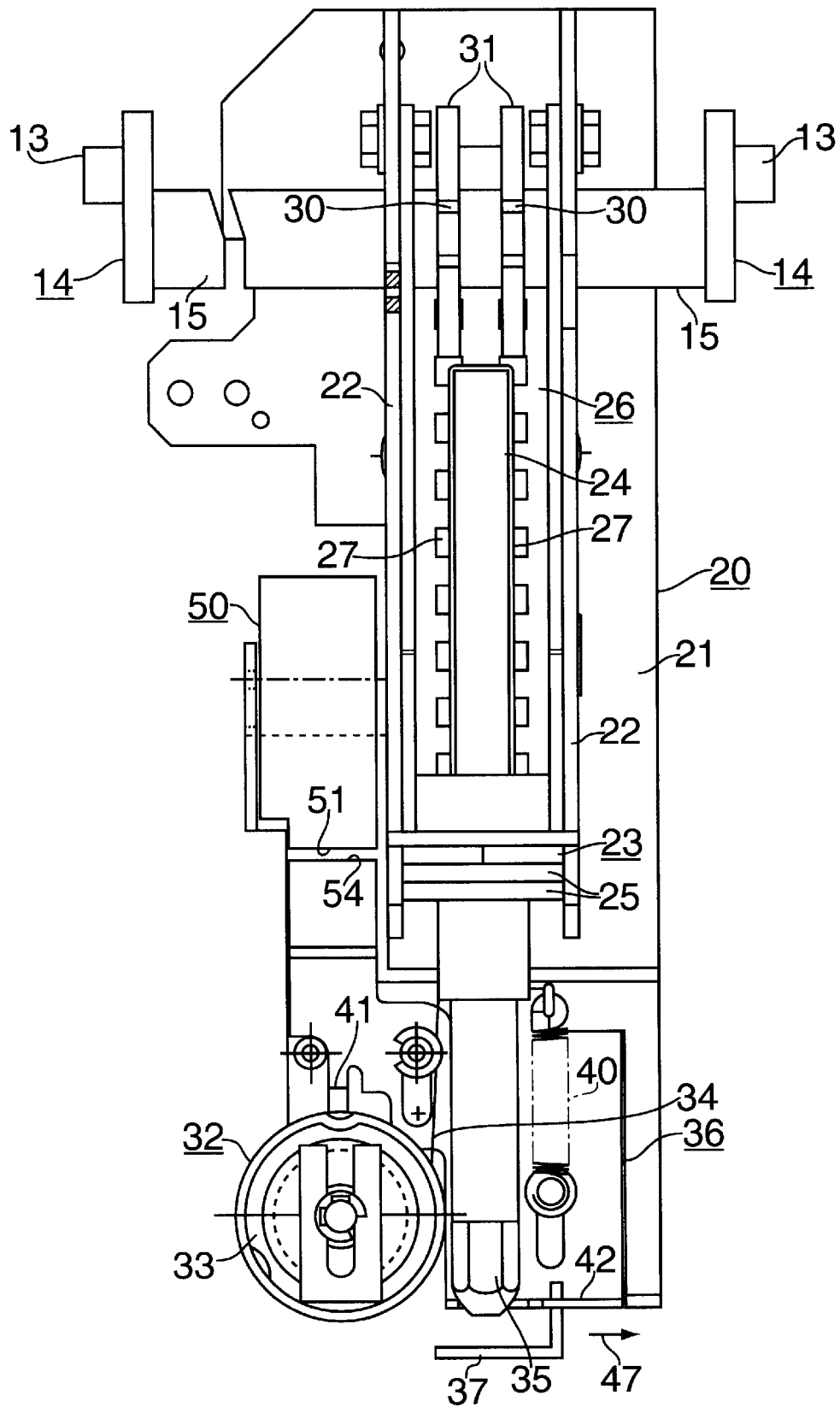
FIG. 2 is a top view of a device, which is designated below as a traveling system, for insertion and withdrawal of the power switch illustrated in FIG. 1 within an insertion rack.

In the area of angle bend 42, slide 36 is provided with a recess 44 that works together with the above-mentioned locking element 37 (FIGS. 2, 3 and 4). Locking element 37 is displaceably guided across threaded spindle 24 in a suitable manner and has a blocking arm 45 that overlaps angle bend 42. As shown in detail in FIGS. 3 and 4, blocking arm 45 is also provided with a recess 46 arranged in such a way that closing element 37 can be displaced in the direction of an arrow 47 (shown in FIGS. 2 and 3) and thus head piece 35 of threaded spindle 24 can be made accessible.

If tool 17 is pulled away from threaded spindle 24, when switching device 1 is not in one of the intended positions, i.e., the operating position, the test position or the isolating position, then slide 36 cannot return to its starting position because snap-in pin 41 is not opposite one of the recesses on the circumference of drum 33 assigned to the above-mentioned positions. Likewise, locking element 37 cannot be reset to its starting position because blocking arm 45 abuts against the right edge of angle bend 42 of slide 36.

Figure 7:
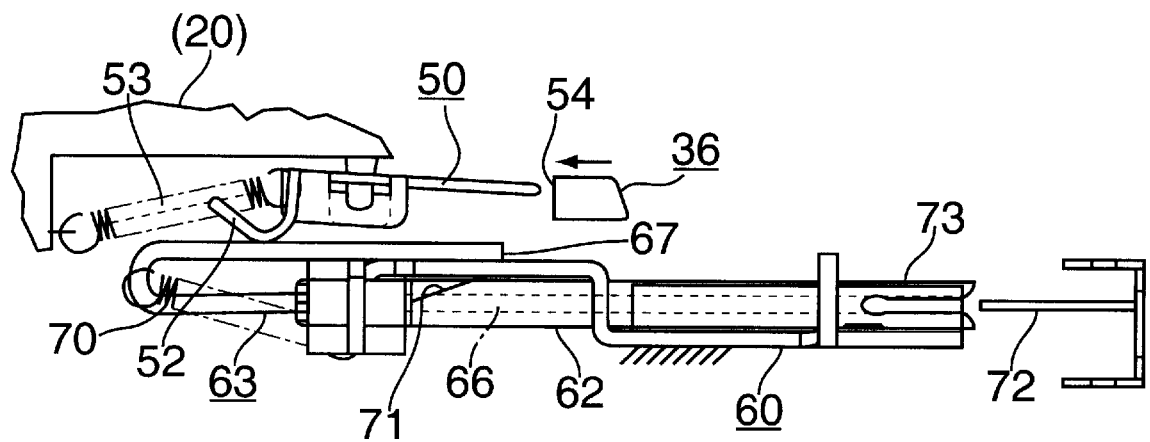
FIGS. 7 and 8 show the interaction between the push rod according to FIGS. 5 and 6 and a blocking lever belonging to the traveling system according to FIG. 2, where
Figure 8A:
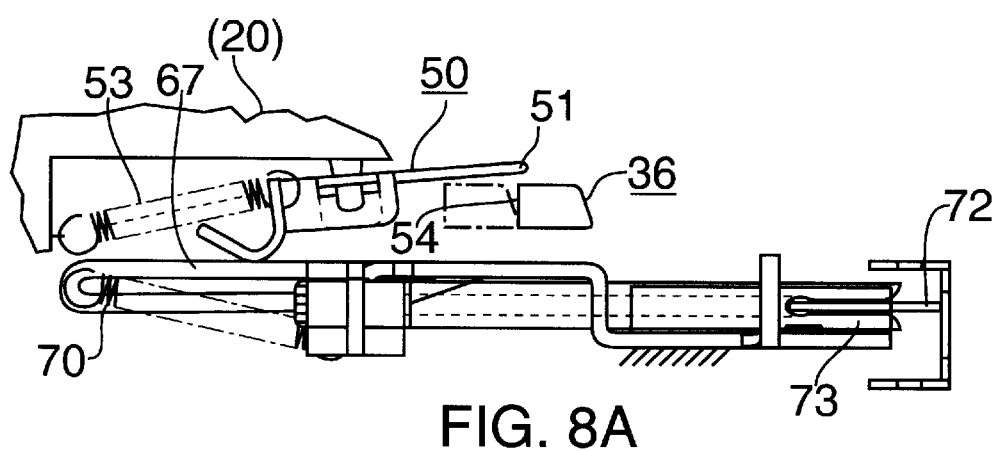
FIG. 8b is a detail view of the pushrod and inclined face.
Figure 8B:
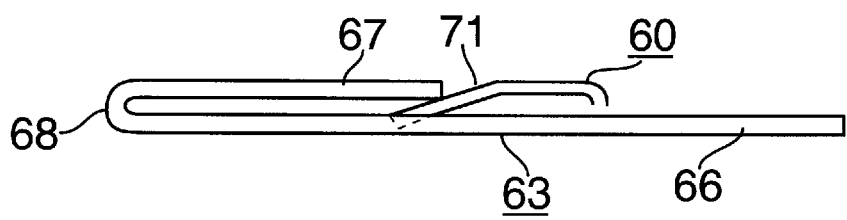

As shown in detail in FIG. 2 in conjunction with FIGS. 7 and 8, a blocking lever 50 is mounted on base plate 21 of traveling system 20. Blocking lever 50 is designed with two arms with respect to a swivel axis (shown with dash-dot lines) and it has a working face 51 on the end of one lever arm and a contact angle 52 on the end of the other lever arm. Due to a restoring spring 53 which is designed as a draw spring and acts on the end of blocking lever 50 provided with contact angle 52, the blocking lever is pre-stressed into an angle position where working face 51 is a distance away from a mating face 54 of slide 36 and therefore slide 36 can be displaced by tool 17 in the manner described above. However, as explained in greater detail below, the blocking lever can be pivoted against the action of restoring spring 53 so that working face 51 is opposite mating face 54 of slide 36 and thus slide 36 is blocked.

Figure 5:
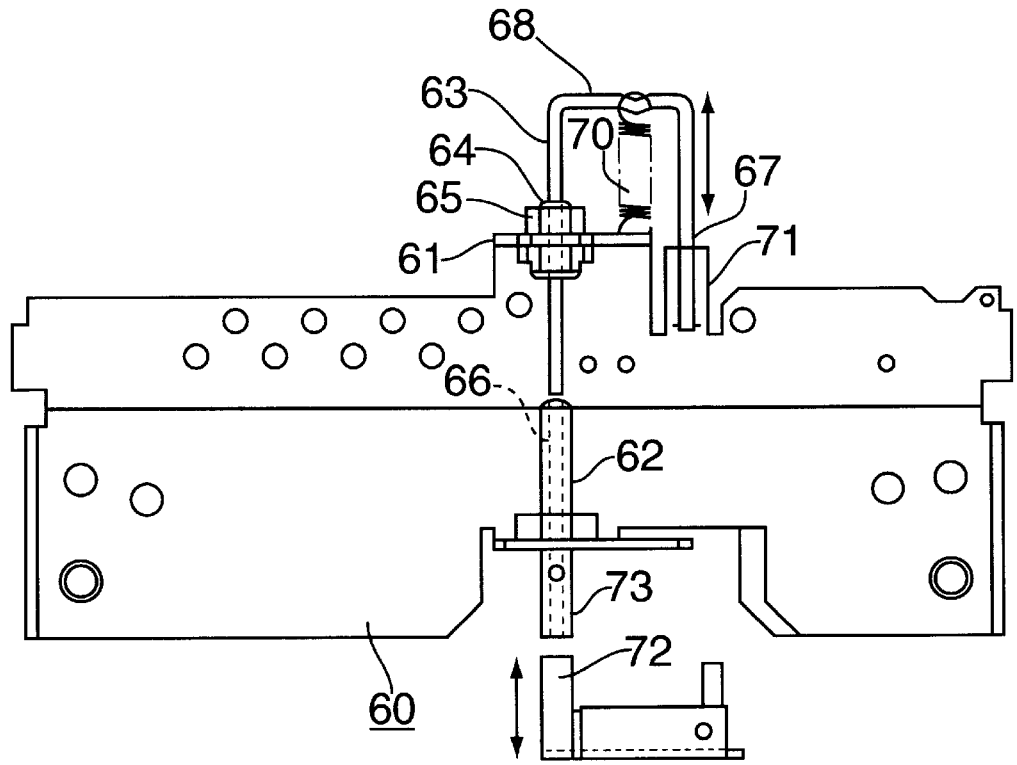
FIGS. 5 and 6 show a top view of a carrier arranged on the bottom of the insertion rack indicated in FIG. 1 with a guide tube for a push rod.
Figure 6:
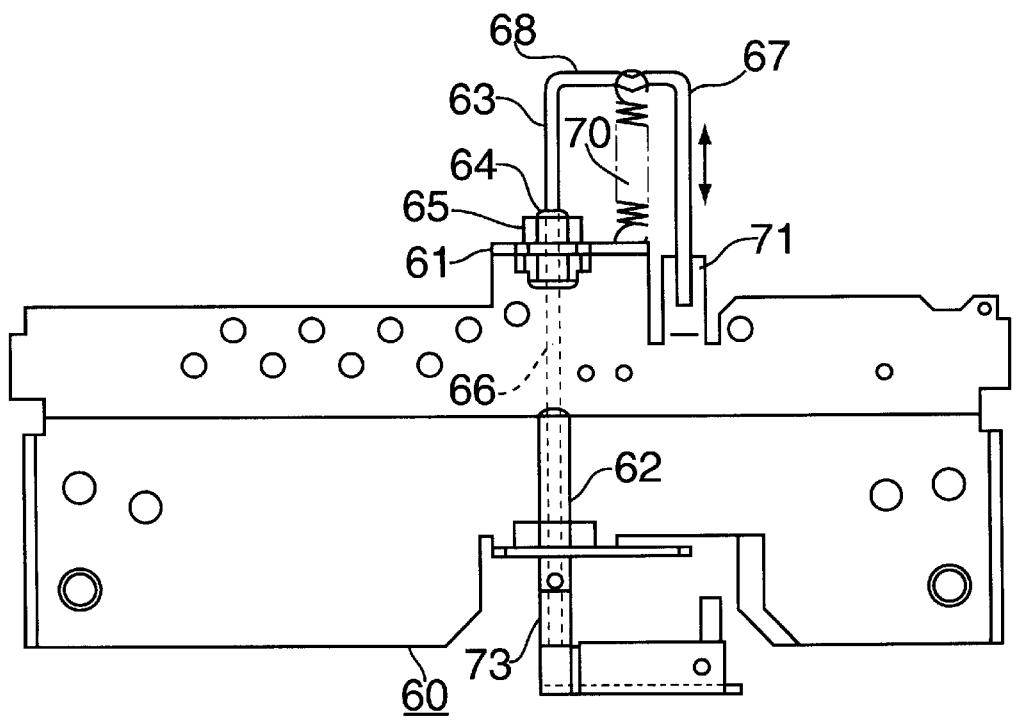

In the lower area of insertion rack 10, a carrier 60 as illustrated in FIGS. 5 and 6 is provided with an angled leg 61 through which extends a guide tube 62 for a push rod 63. Guide tube 62 is provided with a threaded section 64 on which sit two nuts 65 gripping leg 61 between them. Thus guide tube 62 can be secured in a desired position relative to the carrier by adjusting nuts 65 on threaded section 64. In this way guide tube 62 can be aligned at a right angle to the plane of the door 18 of switchboard cell 7 (FIG. 1) so that push rod 63 executes a stroke sufficient to operate blocking lever 50 (FIG. 8) when door 18 is closed (FIG. 1).

Push rod 63 has a basic U-shaped design and has one leg 66 accommodated in guide tube 62 and a parallel exposed leg 67. A cross leg 68 connecting legs 66 and 67 serves as an abutment for a retracting spring 70 acting at an angle to the direction of guide tube 62. Therefore, the end of exposed leg 67 is always in contact with an inclined face 71 formed by a suitably bent part of carrier 60.

Push rod 63 can be operated by a pressure piece 72 that is connected to door 18 and can be inserted into a slotted front part 73 of guide tube 62. Pressure piece 72 acts on leg 66 of push rod 63 so that the exposed leg 67 is displaced along inclined face 71. Leg 67 thus changes its position relative to switching device 1, as explained below with reference to FIGS. 7 and 8.

FIGS. 7 and 8 show schematically the lower area of switching device 1 which faces carrier 60 and on which traveling system 20 is mounted. Of traveling system 20, only blocking lever 50 and a section of slide 36 having mating face 54 are shown. When door 18 is closed (FIG. 8), pressure piece 72 is inserted into guide tube 62 and holds push rod 63 in its position against the action of retracting spring 70; in this position, the end of exposed leg 67 rests on inclined face 71 and thus assumes a relatively lowered position with respect to contact angle 52 of blocking lever 50. Working face 51 is therefore distanced from mating face 54 of slide 36 to the extent that slide 36 can be operated and threaded spindle 24 can be rotated for displacement of switching device 1 in switchboard cell 7. For the sake of clarity, the lower portion of FIG. 8 shows only a part of carrier 60 with inclined face 71 and push rod 63.

When door 18 is opened, pressure piece 72 withdraws from slotted front part 73 of guide tube 62. Push rod 63 follows this movement under the influence of retracting spring 70 until the end of exposed leg 67 reaches the upper end of inclined face 71 and thus achieves a relatively elevated position of leg 67 with respect to switching device 1. This causes blocking lever 50 to pivot against the action of restoring spring 53 so that working face 51 is directly opposite the mating face 54 of slide 36, and slide 36 is thus blocked to prevent displacement. Tool 17 thus cannot engage with threaded spindle 24. It is therefore also impossible to move switching device 1 in its insertion rack 10.

Exposed leg 67 always runs parallel to the lower side of switching device 1, so the position of blocking lever 50 does not change when the switching device is displaced by traveling system 20 in insertion rack 10 or switchboard cell 7. Exposed leg 67 is dimensioned so that contact angle 52 of blocking lever 50 rests on leg 67 within the entire path of travel provided for switching device 1.

What is claimed is:

1. A device for controlling a traveling system of a movably mounted switchgear, based on a position of a door of a cell that accommodates the switchgear, the device comprising:

a drive having a spindle;

a movable slide movable from a first position in which the movable slide prevents access to spindle to a second position in which the movable slide allows access to the spindle;

a push rod, the push rod comprising a leg, the door moving the push rod from a first position to a second position when the door is in a closed position;

a pivoted blocking lever, the blocking lever having a working face, the working face, in a blocking position, blocking movement of the slide to the second position, the push rod being engaged with the blocking lever;

an inclined face, the leg of the push rod engaging and being movable across the inclined face from the first position of the push rod to the second position of the push rod, wherein in the first position of the push rod, the leg of the push rod moves the blocking lever to the blocking position, and wherein in the second position of the push rod, the leg of the push rod moves the blocking lever to a release position in which the slide is not blocked; and a retracting spring, the retracting spring biasing the push rod toward the first position.

2. The device of claim 1, wherein:

the push rod is U-shaped, the push rod comprising at least two legs, wherein one of the at least two legs is guided in a guide tube mounted approximately at a right angle to the door in the closed position, and wherein another of the at least two legs is biased into contact with the inclined face by the retracting spring.

3. The device of claim 2, wherein:

the inclined face is mounted on a carrier, and wherein the guide tube is mounted on the carrier, the carrier being mounted on a bottom of the cell.

4. The device of claim 3, wherein:

the guide tube comprises a threaded section, and wherein the carrier comprises a feed-through opening, the threaded section being mounted on the feed-through opening, the carrier section further comprising two nuts mounted on the threaded section, the guide tube being adjustably mounted by the two nuts.

5. The device of claim 1, wherein:

the spindle is threaded.

* * * * *